United States Patent [19]

De Witt

[11] 3,882,355

[45] May 6, 1975

[54] FLAT SCREEN DISPLAY DEVICE USING CONTROLLED COLD CATHODES

[75] Inventor: David De Witt, Poughkeepsie, N.Y.

[73] Assignee: International Business Machines Corp., Armonk, N.Y.

[22] Filed: Dec. 29, 1972

[21] Appl. No.: 319,587

[52] U.S. Cl...... 315/169 TV; 315/108 B; 313/346 R

[51] Int. Cl............................................. H05b 41/00

[58] Field of Search.................. 315/169 R, 169 TV; 313/220, 109, 108 A, 346 R, 108 B

[56] References Cited

UNITED STATES PATENTS

| | | | |
|---|---|---|---|
| 2,960,659 | 11/1960 | Burton | 313/103 X |
| 3,264,074 | 8/1966 | Jones | 29/183.5 |
| 3,614,769 | 10/1971 | Coleman et al. | 315/169 TV X |
| 3,624,273 | 11/1971 | Gale | 315/169 TV |
| 3,651,509 | 3/1972 | Ngo | 315/169 TV |
| 3,679,933 | 7/1972 | Nakada et al. | 315/169 R X |
| 3,754,161 | 8/1973 | Johnson | 315/169 TV |

OTHER PUBLICATIONS

Kohn: Cold-Cathode Electron Emission From Silicon, Applied Physics Letters, Vol. 18, No. 7, pp. 272-273, April 1, 1971.

*Primary Examiner*—Nathan Kaufman
*Attorney, Agent, or Firm*—Wolmar J. Stoffel

[57] ABSTRACT

The display device has an electrically conductive phosphor-coated transparent screen, a panel element disposed in close parallel relation to the screen with the panel having an array of electron emitting regions on a semiconductor plate, each controlled by an adjacent memory cell in the plate. An enclosure which includes the screen surrounds the panel. An electric potential is established between the screen and the panel, and a vacuum produced in the enclosure. Preferably, the memory cells associated with the electron emitting regions are storage elements of a shift register which extend throughout the entire array of electron emitters. A binary signal is introduced into the shift register which is used to establish a predetermined pattern of electron emitting regions on the semiconductor panel. This produces a display on the spaced transparent screen when the emitted electrons strike the phosphor on the screen.

14 Claims, 8 Drawing Figures

FLAT SCREEN DISPLAY DEVICE USING CONTROLLED COLD CATHODES

BACKGROUND OF THE INVENTION

This invention pertains generally to display devices, and more particularly to a display device utilizing electron emission into a vacuum from a semiconductor region whose surface has been treated to give it an electron affinity lower than that of a vacuum.

The cathode ray tube has been used as a display component in conventional television receivers, computer displays, and various types of monitoring devices. A normal characteristic of such a tube is that the distance from the screen to the electron source or gun is approximately equal to the width of the picture which is presented on the screen. Consequently, the display device is relatively bulky, requiring large housings. The conventional cathode ray tube has only one electron beam which must be deflected in sequence to each spot on the phosphor screen from which light is desired. To avoid decay of the image, the scanning must be repeated many times a second, requiring a memory in which the display information is stored. Since each phosphor spot is excited a very small fraction of the time, it must emit light at high intensity to produce an acceptable average response in the human eye and hence the electron beam must be accelerated by about 20,000 volts. The repetition rate required to minimize flicker is high enough so that the cost of deflection is an important part of the display cost. In displaying relatively small indicia, the flicker can be quite troublesome. Additionally, in the present day cathode ray tubes, the screen is generally curved. That is, it can be represented as a portion of a sphere particularly in the large size cathode ray tubes. This influences the quality of the subject matter depicted on the screen frequently leading to distortion.

In recent years, alternatives to the cathode ray tube have been employed, such as electroluminescent panels, gas panel displays, solid state devices, and nixie tubes. While the aforementioned devices solve certain problems associated with ther cathode ray tubes such as reduction in space requirements, each has its own individual drawbacks.

SUMMARY OF THE INVENTION

It is an object of this invention to provide an improved display device.

Another object of this invention is to provide an improved display device utilizing emission of electrons from surface regions of an array.

Yet another object of this invention is to provide a new improved display device that is compact, and utilizes relatively low voltages in the operation thereof.

Another object of this invention is to provide an improved display device utilizing a semiconductor plate having electron emitting regions thereon controlled by a memory circuit fabricated in the semiconductor plate.

In accordance with the invention, the display device comprises an electrically conductive phosphor-coated transparent screen, a semiconductor panel element disposed in close parallel relation to the screen with the panel having a matrix array of surface regions facing the phosphorcoated screen regions which are capable of cold emission of electrons, a means to control the emission of electrons from each of the surface regions of the array, a means responsive to an electrical signal for activating and maintaining in a predetermined condition the means to control electron emission, a voltage source to maintain an electric potential between the screen and the panel, and an enclosure surrounding the panel element for maintaining a vacuum in the region between the screen and panel.

DESCRIPTION OF PREFERRED EMBODIMENTS

Figure 1:
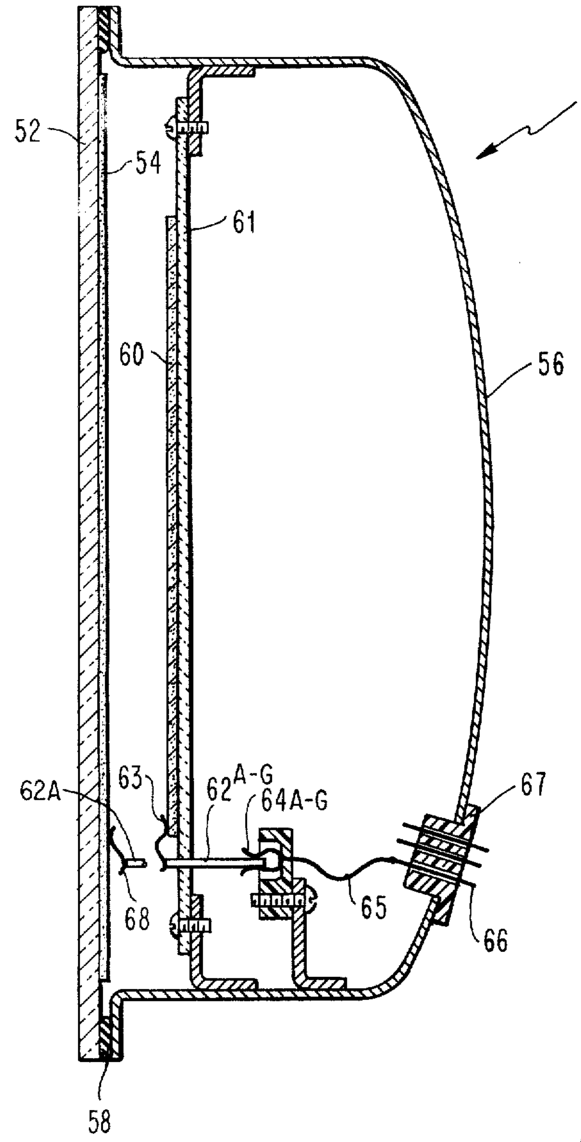
FIG. 1 is a cross-sectional view of the display of the invention illustrating the relative relationship of the respective parts.
Figure 1A:
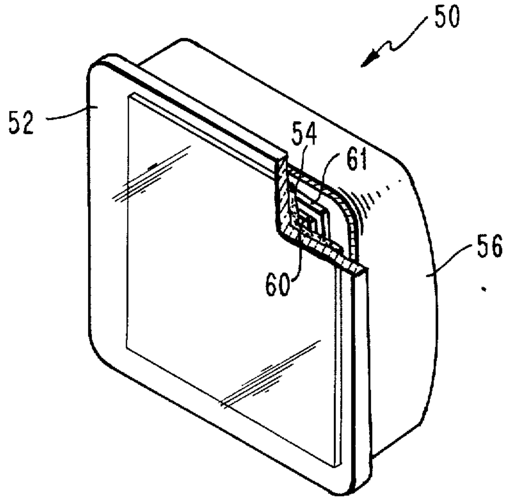
FIG. 1A is a perspective view of the structure shown in FIG. 1 in reduced scale.

Referring now to the Figures of the drawings, in particular FIGS. 1 and 1a, there is depicted a preferred specific embodiment of the display device 50 of the invention. Display 50 has a screen consisting of a glass face plate 52 which is preferably planar, and provided with a phosphor coating 54. A metal envelope 56 together with the glass plate 52 combines to form an enclosure which is use will be evacuated. The junction between the envelope 56 and glass plate 52 is sealed with a suitable seal 58. Disposed within the enclosure is a semiconductor panel element 60 mounted on a suitable backing support 61, as for example, a ceramic substrate. On semiconductor panel 60, there is disposed a matrix of regions facing the phosphor coating 54, which regions are capable of cold emission of electrons. Associated with each surface region is a suitable semimconductor device capable of controlling whether or not electrons are being emitted from the region. The structure and operation of the panel 60 will be explained in greater detail hereinafter. The various necessary electrical signals are conveyed to the panel element 60 through a suitable series of electrical connections. A plurality of pins 62 A through G are set or embedded in the ceramic backing substrate 61 and wirebonded by wires 63 to various elements on the semiconductor panel 60. Sockets 64A through G, as shown in FIG. 1 are mounted on the enclosure to engage pins 62A through G that are arranged in a row. Electrical connections 65 are made to pin 66, and sealed in an opening in enclosure 56 by a suitable insulating or dielectric plug A pressure contact element 68 carried on a pin 62A, shown in broken section in FIG. 1, can be used to make electrical contact with the conductive phosphor coating 54. FIG. 1A depicts in perspective the device 50, showing how it might appear in actual use.

In operation, an electric potential on the order of 500 volts is applied between the conductive phosphor coating 54 and the semiconductor panel 60 containing the array of regions capable of cold emission of electrons. In biasing the screen and panel, the screen is biased positive with respect to the panel 60. Electrons emanating from the matrix of regions on the panel 60 are thus accelerated to the phosphor coating 54 which cause it to glow upon striking. The display device can be fabricated to depict any desired configuration or combination of configurations of displays. For example, the entire panel can be used for a single configuration, or alternately, various segments of the panel can be selectively changed and manipulated without disturbing the remaining area segments. Thus, columns and/or rows of areas on the panel can be allotted to displaying specific indicia. Each of the areas can then be changed without disturbing the adjacent areas. Further, as will be explained in greater detail, a modification of the display structure can be fabricated to display various shades of gray.

The semiconductor panel element 60 is preferably formed of a silicon wafer whose surface contains a matrix array of electron emitting regions, each controlled by a storage circuit. The storage circuit state is set by serial information through appropriate address and driving circuitry which can also be on the silicon wafer. The simplest system is to make all the storage circuits the elements of a single shift register. The electron emitting regions dispersed between the circuitry necessary for controlling the emission occupy less than the total area of the panel 60. However, the divergence of the electrons as they leave the panel traveling to the phoshor-coated glass plate 52 is such that substantially the entire screen would be covered. Since the electron emitting areas are very small and numerous, various configurations could be displayed on the screen by a pattern of light dots on the phosphor. As explained previously, each of the electron emitting regions is associated with a memory cell. The cells can be connected serially to form a static shift register. A binary word with one bit for each memory cell is shifted into the shift register until all the information required for an image is in place. Thus, the entire binary word is contained in the register which will depict in the resultant spots on the phosphor a picture of configuration on the screen. An analogy for purposes of illustration is a shift register where each cell has a pilot light, the pilot light corresponding to the electron emitting regions. Alternatively, the semiconductor panel could consist of a combination of addressable for depicting individual configurations, with suitable decoding circuitry included on the panel to selectively address any of the panel regions in order to load a binary word into the desired shift register corresponding to the panel region.

The operability of the device depends on the phenomena of obtaining electron emission into a vacuum from a semiconductor region which contains an excess minority carrier population, that is electrons, and whose surface has been treated to give it electron affinity lower than that of a vacuum. This broad concept has been addressed in an article entitled "A Silicon Negative Affinity Cold Cathode" by by E. S. Kohn, IEDM Final Program, IEEE, October 1971, Paper 18.4, p. 138, and also in an article entitled "Cold Cathode Electron Emission from Silicon" by E. S. Kohn, Applied Physics Letters, Vol. 18, No. 7 Apr. 1, 1971 pp. 272–273. The surface of the semiconductor, preferabaly silicon, can be treated in any suitable manner to achieve an electron affinity lower than that of the vacuum, as for example, by providing a thin coat of cesium, or the like. The excess electron population in a region can be injected by forward biasing a diode configuration comprised of a P region at the surface and an adjacent N region.

Figure 2:
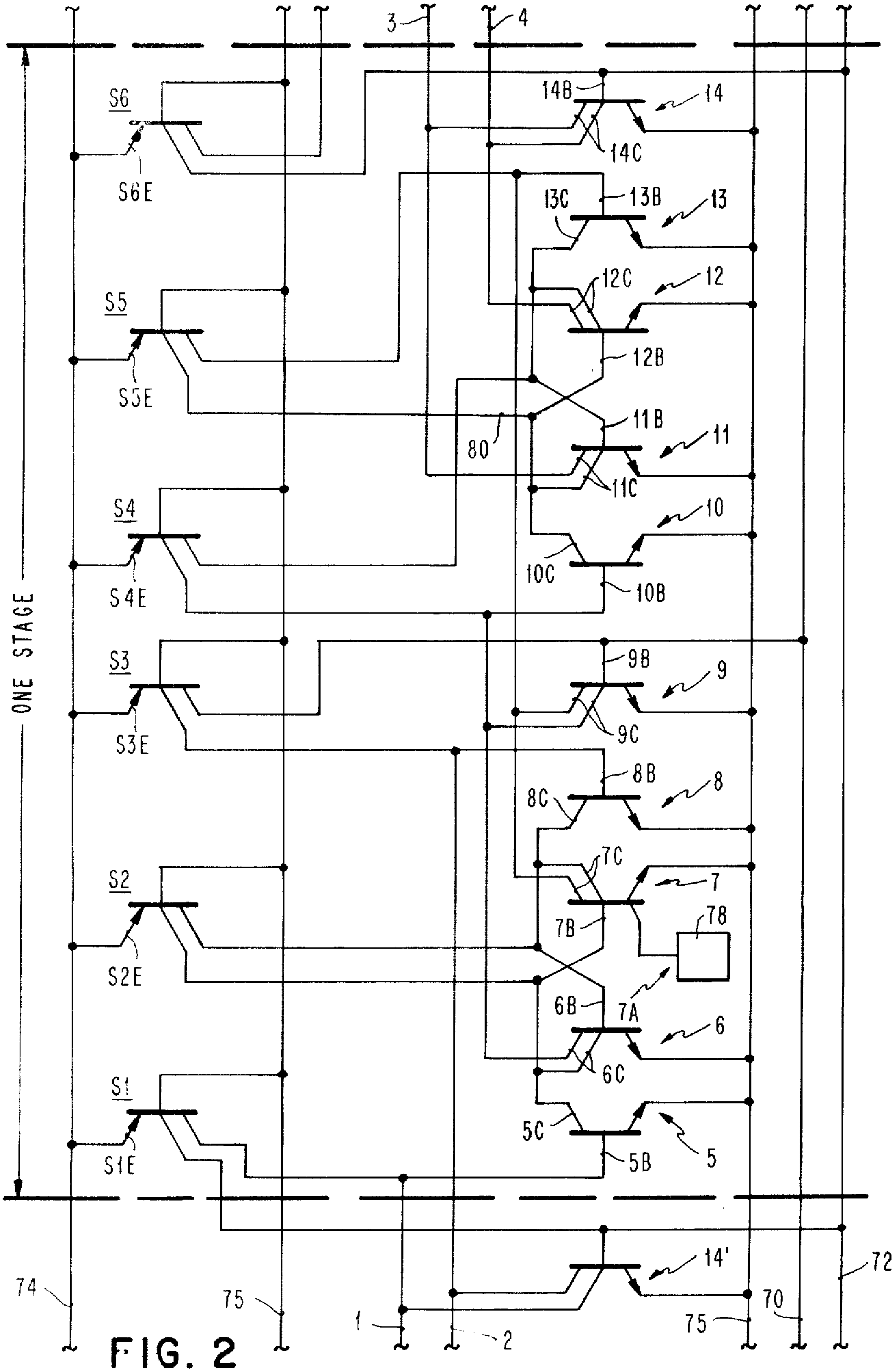
FIG. 2 is a schematic circuit diagram illustrating one preferred embodiment of a shift register circuit that can be incorporated on the panel element along with the matrix array of surface regions capable of cold emission electrons.

Referring now to FIG. 2, there is depicted schematically one stage of a shift register. Each of the electron emitting regions on the panel has associated therewith a similar stage of a serially connected shift register. The stage of the shift register can be broken down into two sections, that is a primary section for storing one bit of a binary word, and controlling the electron emitting region in accordance therewith, and a secondary section that stores the word temporarily during the loading of the shift register. As indicated in the schematic, the storage element of the primary section is a flip flop circuit consisting of transistors 6 and 7, and the secondary stage consisting of a similar flip flop circuit utilizing transistors 11 and 12. Two clock lines 70 and 72 are utilized to load the binary signal into the register whose operation will be explained in more detail hereinafter, Conductive line 74 is biased positively with respect to conductor line 75 which in the preferred embodiments constitutes the semiconductor substrate. The transistors S1 through S6 serve as current sources for operating the shift register depicted. In the holding state, that is the state used to control the electron emitting region associated with the stage of the shift register, both clock lines 70 and 72 are positive. The state of the cell, that is the relative states of transistors 6 and 7, is thereby maintained. Transistors 5 and 8 are both nonconducting because transistor 14' of the previous stage in conducting. We can arbitrarily define a logic "1" as conduction in transistor 7. The base region of 7, as will become more apparent in the explanation that follows, has a region 7A which has been constructed so as to emit electrons to a vacuum ambient when the emitter base diode of transistor 7 is forward biased. 7A is in essence an extension of the base diffusion of transistor 7. As more clearly illustrated in FIG. 3, which also illustrates a preferred specific embodiment of the circuitry, 7A is a diffusion having an enlarged surface area 76 provided with a coating 78 which gives it an electron affinity lower than that of a vacuum. 7A is effectively a third collector on the base of transistor 7 connected through a vacuum to the positively biased conductive screen 54 of the display device 50. When transistor 7 is conducting, a bright spot will be produced on the screen in conductive phosphor 54. When transistor 7 is in a non-conducting state and transistor 6 will be conducting, no electrons are emitted from region 78 and a dark spot will appear on the screen.

Figure 2A:
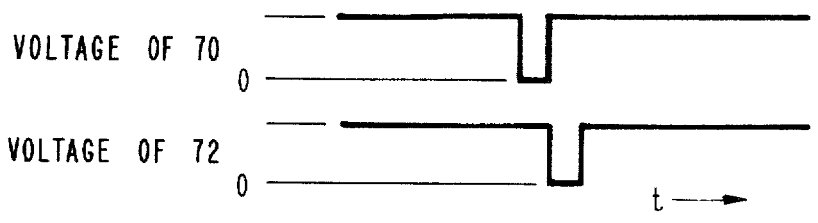
FIG. 2A illustrates the sequence of clock pulses for operating the circuit shown in FIG. 2.

In shifting the binary signal into the shift register, the relative conductive state of transistors 6 and 7 which represents a binary bit of information is transferred or shifted into the secondary section to transistors 11 and 12. Shifting the information is accomplished by pulsing clock line 70 as indicated in FIG. 2A. The clock waveform consists of a brief depression of the voltage in line 70 to zero, followed by, but not simultaneous, with a brief depression of the voltage in line 72 to zero. When the voltage in line 70 goes to zero, transistor is made non-conducting and the state of the flip flops of transistors 6 and 7 is transferred to the flip flop combination of transistors 11 and 12 by transistors 13 and 10. When the voltage in clock line 70 is restored to the original up condition, the voltage in line 72 is reduced which stops conduction in transistor 14. This allows the state of the flip flop of transistors 11 and 12 to be transferred to the next stage lines 3 and 4. At the same time transistors 14' of the previous stage is similarly rendered non-conductive by the pulse in line 72 and the state of the previous stage (not shown) which appears on line 1 and 2 can set the flip flop configuration of transistors 6 and 7. In operation, a word of *n* bits is introduced into the shift register consisting of n stages and retained as long as the display on the screen is desired.

Figure 3:
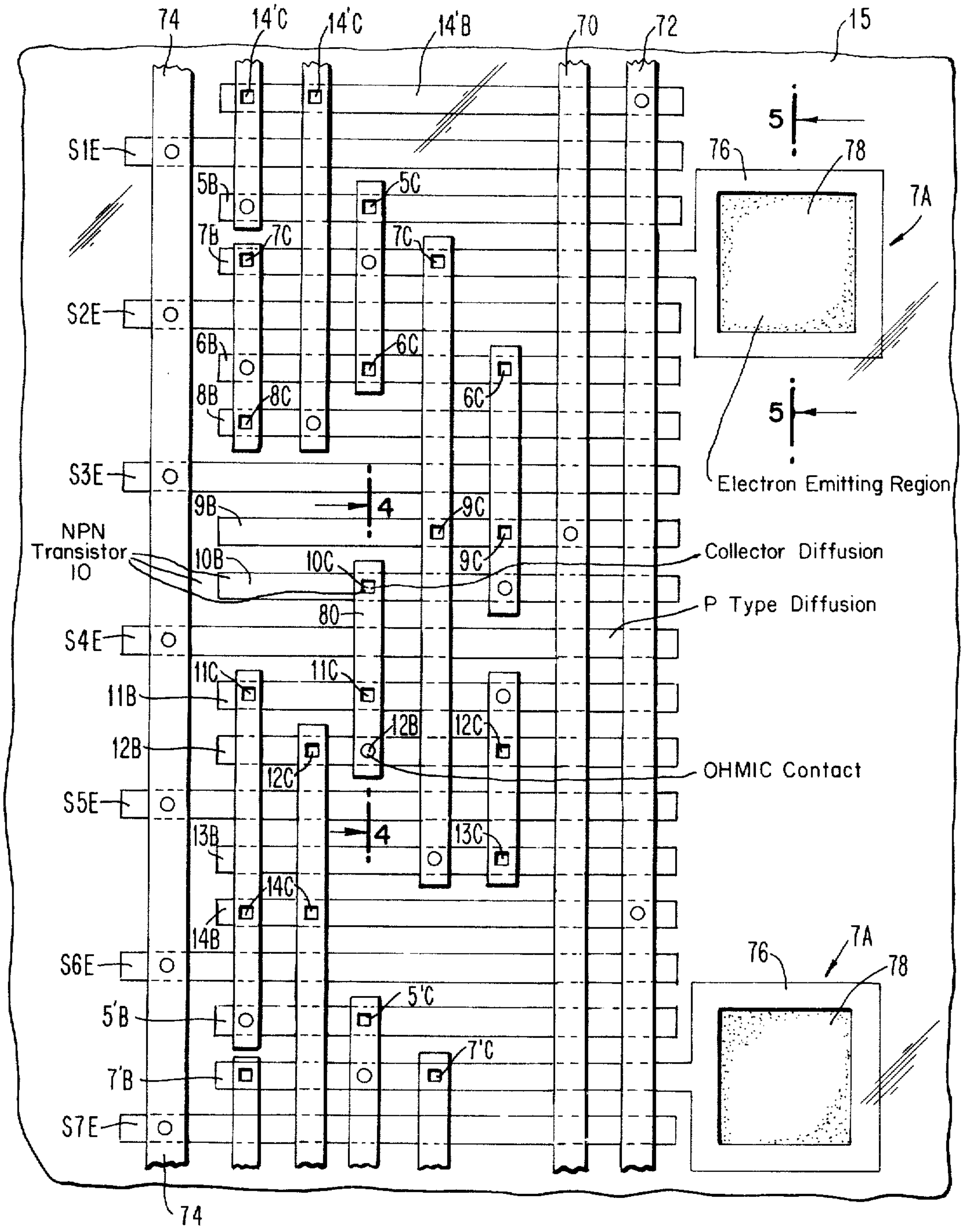
FIG. 3 is a top plan view in broken section showing one stage of the shift register circuit configuration shown in FIG. 2 as it is embodied in a preferred embodiment of the semiconductor panel element.

The preferred semiconductor structure to implement the circuit illustrated in FIG. 2, is shown in FIG. 3. This technology is commonly referred to as Merged-Transistor Logic (TML) and is described in an article entitled "Merged-Transistor Logic (MTL) – A Low-Cost Bipolar Logic Concept" by Horst. H. Berger and Siegfried K. Wiedmann in IEEE Journal of Solid State Circuits, Vol. SC-7, No. 5, October 1972, pp. 338–346 and also in U.S. Pat. No. 3,736,477. Merged-transistor logic is a relatively new innovation using a series of parallel diffusions in a semiconductor connected to transverse metal stripes. The diffusions can additionally contain opposite type diffusions.

In FIG. 3, the horizontal lines are base diffusions. Small squares where the vertical metal stripes cross the horizontal stripes are collector diffusions in the base diffusions contacted by crossing the vertical stripe. Circles where the vertical metal stripes cross horizontal diffused regions are ohmic contacts. Conductor stripe 74 which makes ohmic contact to various regions in the device is connected to a positive voltage source. Conductor 75 in FIG. 2 is the semiconductor substrate connected to ground. Metallurgy lines 70 and 72 correspond to clock lines 70 and 72 in FIG. 2.

Comparing the structure of FIG. 3 with the schematic illustrated in FIG. 2, transistors S1 through S6 are lateral PNP transistors, wherein the semiconductor substrate indicated in FIG. 2 as line 75 acts as the base. The emitters of each of the respective transistors are diffused regions indicated on FIG. 3 by the designation of the transistor followed by an E. For example, the emitter region of transistor S1 is S1E. The emitter diffusions for the remaining transistors are similarly numbered. Transistors 5 through 14 are NPN using the substrate as the emitter (again indicated by number 75 in FIG. 2). Each of the base regions of the respective transistors is indicated in FIG. 3 by the number of the transistor followed by the letter B. In like manner, the collectors of the respective transistors are indicated by the number followed by the letter C.

Figure 4:
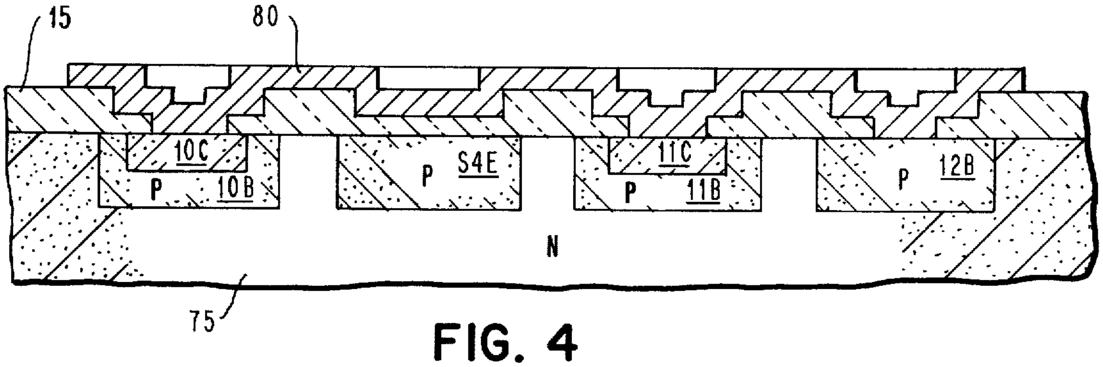
FIG. 4 is a sectional view taken on line 4—4 of FIG. 3 in greatly enlarged scale.
Figure 5:
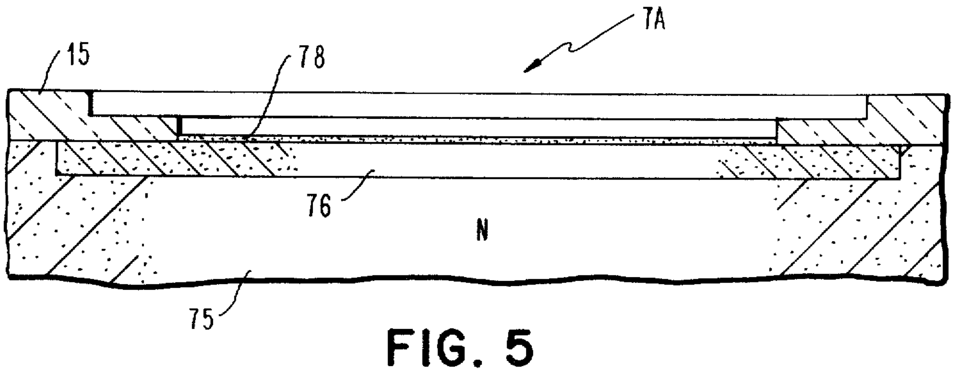
FIG. 5 is a sectional view taken on line 5—5 of FIG. 3 shown in greatly enlarged scale.

Referring now to FIG. 4, there is depicted a cross-sectional view taken on line 4—4 of FIG. 3. Region S4E is a P-type diffusion in the N substrate 75, that is the emitter for lateral transistor S4. Metallurgy stripe 80 makes contact through insulation layer 15 to two diffused regions 10C and 11C, which are collector regions of transistors 10 and 11, respectively. Stripe 80 makes ohmic to diffused region 12B which is the base of the transistor 12 and also acts as one of the collector regions for transistor S5. In general, the diffused region S1E through S6E are at a positive potential with respect to the N-type substrate so that they act as the emitters of the PNP transistors and the substrate acts as the base. Transistors S1 through S6 thus are always biased on and therefore supply a constant current to each of the base regions of transistors 5 through 14.

Diffusion region 7B, as indicated in FIG. 3, includes an enlarged area 7A which is covered by suitable coating to facilitate the emission of electrons into a vacuum. In operation, when regions 5B and 6B are at a low potential, the collector regions 5C and 6C cannot conduct, and current is collected by region 7, as the collector of the lateral PNP of which S2E is the emitter. This current forward biases region 7B with respect to the substrate. Region 7A is part of region 7B and when it is forward biased the substrate injects electrons into it. Those electrons which diffuse to the surface coating 78 are able to escape into the vacuum.

Figure 1B:
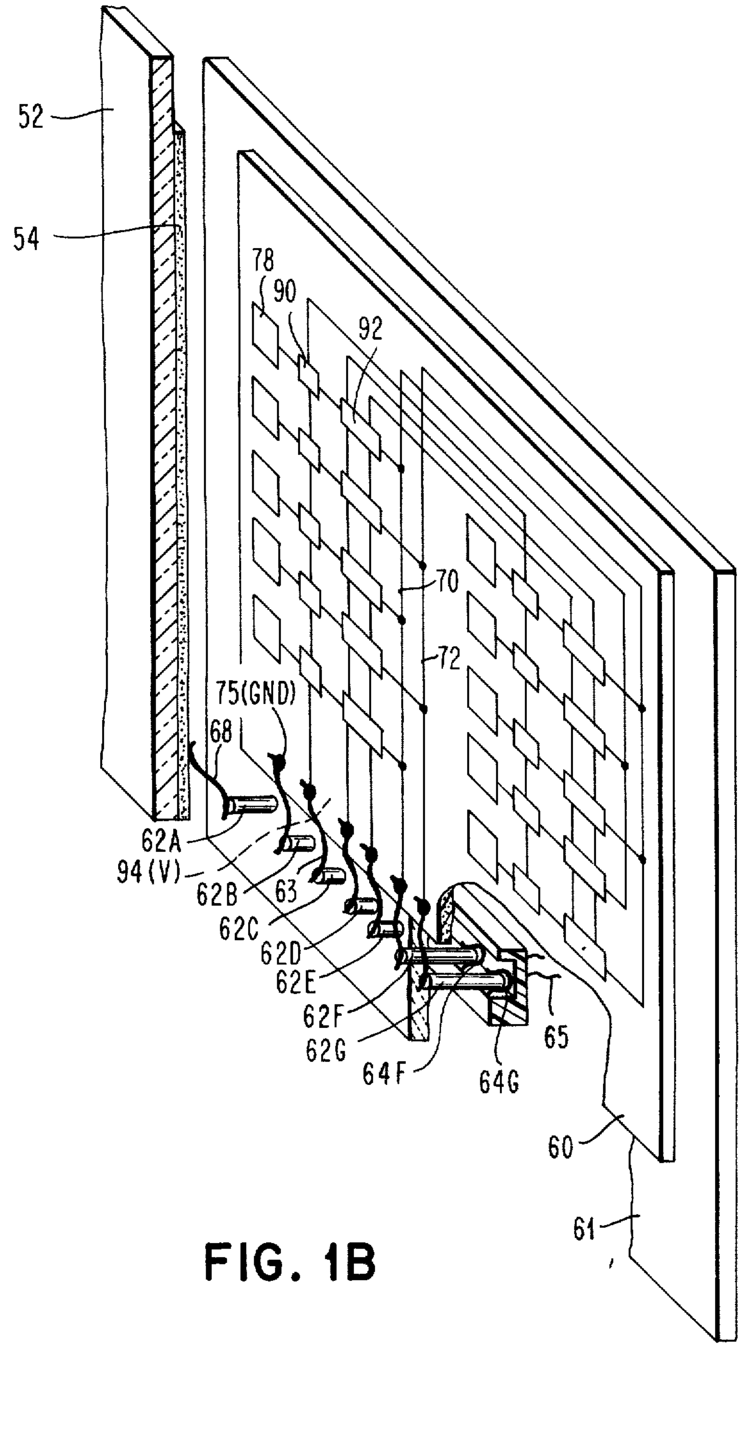
FIG. 1B is an isometric drawing in broken section showing the general arrangement of elements of the display device combination of the invention.

Referring now to FIG. 1B, there is depicted the general arrangement of the elements of the display combination of the invention. As indicated, a matrix of surface regions 78 are provided on semi-conductor panel element 60 that face a phosphor coated screen 52. The regions 78 and the associated elements on panel 60 are shown in greatly enlarged scale for purposes of illustration. Associated with each surface region 78 is a suitable means 90 to control the emission of electrons from the associated surface region. In the preferred embodiment, this means is a transistor 7 as shown in FIG. 2. Line 74 provides power for operating the associated circuitry. Also associated with control means 90 is a means that is responsive to an electrical signal 92 for activating and maintaining the means 90 in a preferred condition to control the electron emission. As is indicated, 92 is a single stage of a shift register where each successive stage is connected together and also the entire combination connected to a set of clock lines 70 and 72 through pins 62F and 62G. Line 75 is connected to ground and line 94 is connected to a high voltage source which maintains an electric potential between the screen 52 and the panel 60. Although not shown specifically in FIG. 1B, there is also provided an enclosure which will maintain a vacuum in at least the space between the screen 52 and the panel 60.

The basic display device of the invention can be modified to provide a quantized gray scale, if desired. A preferred mode of a quantized gray scale consists of fabricating the semiconductor panel and breaking each of the electron emitting areas into separate regions, each controlled by a stage of a shift register. Thus, the more sections of each spot that are caused to emit electrons, the brighter will be the dot which appears on the screen. A binary scale can be provided have $2^{n-1}$ levels of light by devoting N memory cells to each light spot. Each cell of a group of N cells is assigned a value in a sequence 1, 2, 4, 8,--- and its region 7A has an electron emitting area proportional to its assigned value. The electron emitting of each group of N are located adjacent to each other and controlled by a separate shift register cell. Alternately, shades of gray could be produced by varying the amount of electron emission from each of the individual electron emitting areas by utilizing a quantizer to vary the cell intensity.

Various uses of the basic displayed devices of the invention can be made including providing a moving picture. In such an application, a dynamic shift register is used in combination with a phosphor coating on the screen which has a decay time matching the cycle time of the binary word.

A light pen can be adapted to the display by storing the picture information in an auxiliary store and sending a single pulse through the shift register. The pen would contain a photo-electric cell, and a counter would count shift pulses. The location of the light pen is obtained by using the photo-electric cell signal to gate out the shift pulse count. The entire process of storing the picture information, sending a single pulse through the shift register and reloading the picture can be accomplished fast enough with as many as one million picture elements so that the human eye will only barely detect a blink of the picture when the light pen is read out.

While the invention has been particularly shown and described with reference to the preferred embodiments thereof, it will be understood by those skilled in the art that the foregoing and other changes in form and detail may be made therein without departing from the spirit and scope of the invention. What is claimed is:

1. A display device comprising:

an electcrically conductive phosphor coating on a transparent screen, a semiconductor integrated circuit panel element in close parallel relation to said screen having embodied 1. a matrix array of surface regions facing said phosphor coating, each of said surface regions being one electrode of a diode capable of cold emission of electrons into a vacuum when electrically biased.
2. a plurality of control devices, each of which is connected to control the electrical bias of an associated surface region of said matrix,
3. storage circuitry having a plurality of storage elements, each storage element being arranged to be capable of continuously activating as associated control device, means for translating externally applied digital signals to establish the desired state of each of said storage elements, means to maintain an electric potential between said screen and said panel element, and means for maintaining a vacuum at least in the space between said screen and said panel.

2. The display device of claim 1 wherein each of said surface regions in said matrix on said semiconductor panel element is an exposed region of silicon disposed over a P-type region in an N-type silicon substrate, said surface regions having means to provide an electron affinity lower than that of vacuum.

3. The display device of claim 2 wherein said exposed region has a thin overlying layer of cesium adapted to provide the silicon surface with an electron affinity lower than that of vacuum.

4. The display device as claim 2 wherein said plurality of control devices is a plurality of switch means adapted to bias said P-type regions underlying said surface regions relative to said N substrate.

5. The display device of claim 4 wherein said switch means is an NPN transistor having the collector connected to said P-region underlying said surface region.

6. The displaly device of claim 5 wherein said storage circuitry is a shift register having serially connected cells associated with each of said surface regions, and means responsive to the condition of each cell of said register to control said plurality of control devices.

7. The display device of claim 6 wherein the shift register of said semiconductor panel includes a flip flop memory circuit.

8. The display device of claim 6 wherein said shift register circuitry is in the form of merged transistor logic structure.

9. The display device of claim 8 wherein said shift register circuitry includes elongated parallel P-type surface diffusions in an N-type substrate, parallel metallurgy lines extending transverse to said surface diffusions, individual N-type diffused regions within said elongated surface diffusions, said metallurgy lines in ohmic contact with said regions.

10. The display device of claim 1 wherein there is means includes to provide a light intensity variation including means separating each of said surface regions into individual areas, means for controlling electron emission from each of said areas.

11. The display device of claim 10 wherein the ratios of areas of said surface regions are a geometric progression.

12. The display device of claim 1 wherein said matrix of surface regions on said panel is arranged in a plurality of blocks, said plurality of control devices includes a means to randomly address each of said blocks, and a shift register serially associated with the surface region of each individual block.

13. The display device of claim 12 wherein said plurality of control devices further includes row and column lines for randomly addressing said blocks of surface regions, and means to load a binary word into the shift register of a selected block.

14. The display device of claim 13 wherein said plurality of control devices includes a latch circuit associated with said means to load, means to connect said row and column lines to the selected shift register of a block, means to impart a binary signal and clock pulse to said column and row lines to thereby form a display on the selected block.

* * * * *